United States Patent [19]

Burdorf et al.

[11] 4,305,536

[45] Dec. 15, 1981

[54] AIR GUIDE FOR TAPE TRANSPORTS HAVING AIR JETS AT TANGENT POINTS

[75] Inventors: Donald L. Burdorf, Newport Beach; James Bjordahl, Arcadia, both of Calif.

[73] Assignee: BASF Aktiengesellschaft, Ludwigshafen, Fed. Rep. of Germany

[21] Appl. No.: 170,963

[22] Filed: Jul. 18, 1980

Related U.S. Application Data

[63] Continuation of Ser. No. 794,947, May 9, 1977, abandoned.

[51] Int. Cl.³ .................... B65H 17/32; B65H 23/24
[52] U.S. Cl. .......................................... 226/1; 226/7; 226/97; 226/196; 242/76
[58] Field of Search ............... 226/1, 7, 97, 196, 197, 226/190; 242/76

[56] References Cited

U.S. PATENT DOCUMENTS

| | | | |
|---|---|---|---|
| 3,032,246 | 5/1962 | Fritze | 226/97 |
| 3,087,664 | 4/1963 | Streeter | 226/97 |
| 3,156,398 | 11/1964 | Lauxen et al. | 226/97 |
| 3,658,226 | 4/1972 | Isbell | 226/190 X |
| 3,741,650 | 6/1973 | Leavitt et al. | 226/97 X |
| 3,979,037 | 9/1976 | Burdorf | 226/97 |
| 4,071,177 | 1/1978 | Burdorf | 226/7 |

Primary Examiner—Stanley N. Gilreath
Attorney, Agent, or Firm—Keil & Witherspoon

[57] ABSTRACT

An apparatus for guiding a span of high-speed magnetic recording tape past a recording/transducing head. Low volume pressurized air is utilized to lift the tape off of the guide assembly thereby eliminating sliding friction between the apparatus and the tape. The periphery of the guide is provided with a means to facilitate the formation of an air seal with the edges of the tape thereby substantially isolating the pressurized air from the atmosphere. Air jets are provided at the tangent points where the tape enters and departs from the air guide so as to prevent the tape from touching any portion of the guide during the transport operation. The pressurized air emitted from the air jets located at the tangent point where the tape enters the guide forms a supporting boundary layer of air along the surface of the tape which is carried along by the tape across the guide.

7 Claims, 4 Drawing Figures

AIR GUIDE FOR TAPE TRANSPORTS HAVING AIR JETS AT TANGENT POINTS

This is a continuation of application Ser. No. 794,947, filed May 9, 1977, now abandoned.

INTRODUCTION

The present invention relates generally to an apparatus for guiding a span of recording tape past a magnetic recording head and, more particularly, to a method and apparatus for reducing sliding friction between the guide apparatus and tape by providing a means for emitting pressurized air at the tangent points where the tape enters and departs from the air guide.

BACKGROUND OF THE INVENTION

Although many variations of high speed recording tape guides, including air guides, are known and used in the magnetic recording industry, it has been found that a number of serious problems relating to friction and tape alignment have been associated with their use. These problems become particularly acute when processing video signals due to the high tape speeds involved and, consequently, the multiplicity of tracks of extremely narrow width that must be utilized in order to provide record and/or playback capability for programs of reasonable duration on a tape of manageable length.

For example, in a video system which operates at a tape speed of 120 inches per second, 36,000 feet of tape pass the transducing head each hour. Due to physical and cost limitations in reel size, the data is generally recorded on a multiplicity of parallel tracks, and the shorter length of tape which results is passed repeatedly past the transducer head, each time reading information from a different track. In this manner an 1800 foot reel of tape having 30 tracks can be used to record or playback a 90 minute program utilizing the above-described system.

However, the requirement that the tape pass through the transport 30 times per program has resulted in serious wear considerations which it has been found may be greatly overcome through utilization of an air guide type of tape transport. Such prior guides utilizing a film of air as a lubricant have had serious disadvantages associated therewith such as unequal air pressure distribution across the width of the tape which resulted in undesirable deformation of the tape and the requirement for relatively large quantities of air flow under high pressure in order to support the guided span of tape. These problems were eliminated by the air guide designed in accordance with the invention disclosed in my prior U.S. Pat. No. 3,979,037, the disclosure of which is incorporated herein by reference.

Likewise, due to the requirement that 30 different informational tracks be placed in parallel relation on a tape of reasonable and economical width for consumer use, typically ¼ inch, a related problem concerning alignment of the extremely narrow tracks on the tape with a corresponding transducer head has arisen. This problem is compounded by the fact that commercially available magnetic tape is manufactured to width tolerances which approach the individual track width required (typically about 6 mil with 2 mil spacing between tracks) for utilization of 30 tracks on a ¼ inch tape format. Such alignment problems have been solved by the air guide designed in accordance with the invention disclosed in my prior U.S. Pat. No. 4,071,177, the disclosure of which is also incorporated herein by reference.

Although the above-discussed prior inventions provided acceptable results in many high-speed tape transport systems, it has been found that due to the fact that the tape must come into contact with the tape guide at the tangent points where the tape enters and departs from the air guide so as to provide an adequate air seal, both undesirable amounts of scrape flutter and contamination build-up on the guide surfaces at these points has resulted which degrade the overall performance of the video system.

BRIEF DESCRIPTION OF THE INVENTION

The present invention eliminates the above-described scrape flutter and contamination build-up problems found with prior tape transport designs by providing air jets at the tangent points where the tape enters and depart from the air guide. The pressurized air emitted from the air jets located at the tangent point where the tape enters the guide forms a supporting boundary layer of air of substantially constant pressure along the surface of the tape which is carried along by the tape across the guide. In this manner the tape is prevented from touching any portion of the air guide during the transport operation.

It has been found that although a perfect mechanical air seal is not maintained between the tape and guide trough at the tangent points due to utilization of the present air jet system, in operation significant air pressure and flow problems have not arisen and satisfactory tape fly over the guide assembly may be obtained utilizing inexpensive air pumps which produce only in the range of 0.7 psi of static air pressure and 0.025 cfm of air flow.

Furthermore, it has been found that the mechanical design of the air guide assembly may be significantly simplified by introducing air to the system only at the air jets located at the tangent points. In such circumstances, since the tape flys at only about 1 mil over the bottom surface of the guide trough, it is desirable to form an additional channel in this surface so as to allow better distribution of air over the entire guide assembly as it is carried along by the tape.

DESCRIPTION OF THE PREFERRED EMBODIMENT

Figure 1:
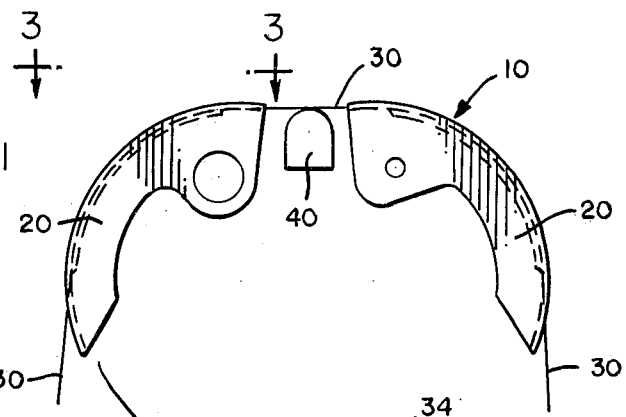
FIG. 1 is a top plan view of an air guide apparatus constructed in accordance with an embodiment of the present invention.

FIG. 1 illustrates an embodiment of a self-centering air guide 10 constructed in accordance with the present invention. A pair of corresponding guides 20 define the path of a span of recording tape 30 as it is transported past transducer head 40. The positioning of guides 20 is symmetrical with respect to head 40, which is mounted therebetween, in order to permit bidirectional transport of the tape. In the preferred embodiment the longitudinal dimension of guides 20 is formed in the shape of a segment of a cylinder having a 1-inch radius and the guides are mounted in the apparatus with a ½-inch gap between their inner edges wherein head 40 is mounted.

Figure 2:
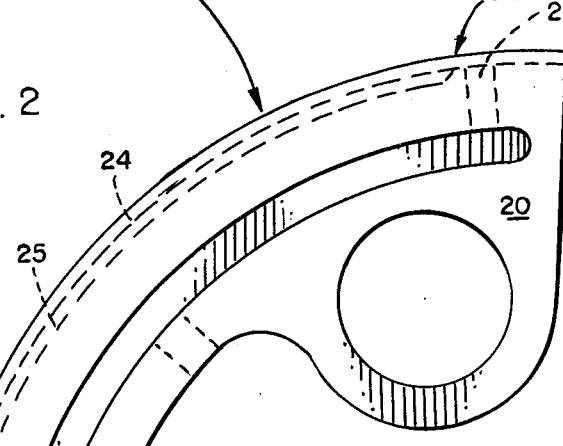
FIG. 2 is an enlarged top plan view of a portion of the apparatus shown in FIG. 1.
Figure 3:
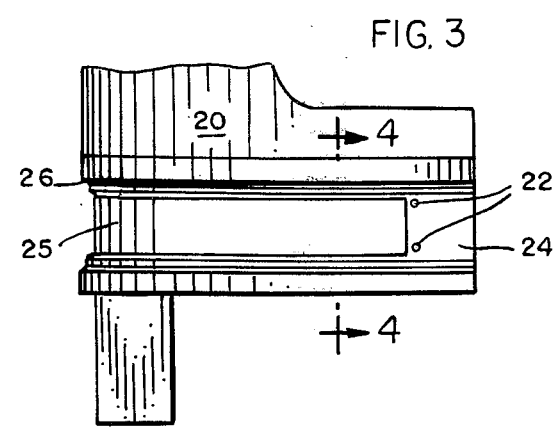
FIG. 3 is an end elevational view of the apparatus shown in FIG. 2.

Referring now to FIGS. 2 and 3, air jets 22 are formed in support surface 24 at the tangent points 32,34 where the tape respectively enters and departs from guides 20 on its way to or from the take-up and supply reels (not shown) or over head 40. Although the air providing means is shown as multiple air jets 22 in the preferred embodiment, it is noted that it may also comprise either single or multiple slots, holes or even a porous material section.

Likewise, FIGS. 2 and 3 show a single pair of air jets 22 located at the entry and departure tangent points 32,34 as being the sole means for providing air under pressure along the entire air guide apparatus. It is noted that although additional air providing means may be located along the support surface 24, the design of the preferred embodiment simplifies construction of the guide apparatus by reducing the complexity of the air delivery system. However, since such an arrangement requires that the supporting boundary layer of air which forms on the underside of the tape be carried along by the tape from the entry tangent point air jet across the downstream guide surface, a channel 25 is formed in support surface 24 so as to aid in air distribution.

Figure 4:
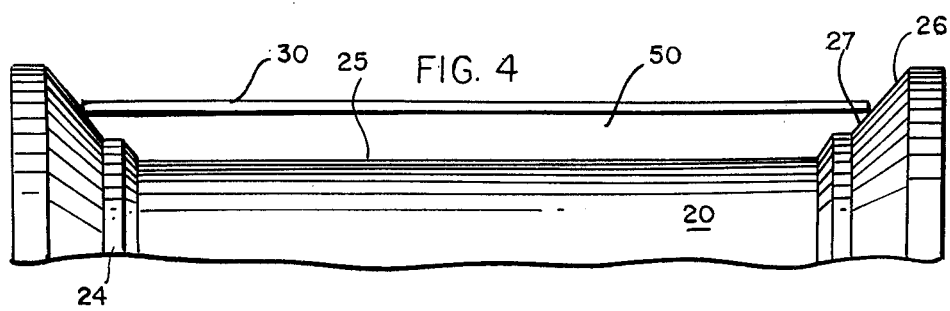
FIG. 4 is a partial, enlarged side view of the apparatus shown in FIG. 3.

Channel 25, which is best shown in FIGS. 3 and 4, is formed in the preferred embodiment to a depth of 5 to 6 mils and extends substantially across the entire width of support surface 24 between the entry and departure sets of air jets 22.

A pair of flanges 26 are provided in the preferred embodiment on opposite sides of the path followed by the tape as it is transported over support surface 24. These flanges are spaced apart at their base 27 a distance less than the minimum width of the tape to be utilized in the system. Although it has been found that optimal results are obtained when beveled flanges 26 of the configuration shown in FIGS. 3 and 4 are utilized as a means for both centering and forming an air seal with the edges of the tape, it is noted that numerous other suitable configurations may be utilized to accomplish these functions either separately or in combination.

In operation, a compressed air supply (not shown) is connected to air jets 22 in guides 20 and a film of presurized air of substantially constant pressure is generated along the air chamber formed by tape 30, support surface 24, flanges 26 and the tangent points 32,34 where the tape enters and exists from the guide in close proximity to the support surface as the boundary layer of air is carried along channel 25 to lift the tape off of the support surface to a point where its width substantially equals the horizontal distance between the beveled flanges. In practice it has been found that pressure in the range of from about 14 to 20 inches of water is sufficient to lift the tape, under 2 ounces of tension, to the above-described level. This operation is best illustrated by FIG. 4 where tape 30 is shown supported on a film of pressurized air 50 between beveled flanges 26. When supported in this manner, tape 30 will rise or drop along the surface of flanges 26 as variations in tape width are experienced during the transport operation, thereby maintaining the longitudinal centerline of the tape in a precise centered relationship with respect to the longitudinal centerline of support surface 24 and guide 20. Hence, lateral movement of the tape is eliminated irrespective of manufacturing variations in tape width and precision alignment of the playback head with the individual track recorded on the tape is maintained at all times.

In addition, since sufficient air pressure may be provided so as to allow for a pressure drop between the edges of the tape and the adjacent surface of the flanges so as to insure that the tape will seek the proper level between the flanges, and since the air jets are provided at the tape entry and departure tangent points of the support surface, scrape flutter and contamination are virtually eliminated since the tape tends to be pushed away from all surfaces of the air guide thereby minimizing physical contact and resulting friction therebetween.

While several particular embodiments of the present invention have been shown and described in detail, it should be understood that various obvious changes and modifications thereto may be made, and it is therefore intended in the following claims to include all such modifications and changes as may fall within the spirit and scope of this invention.

What is claimed is:

1. An air guide apparatus adapted to support and guide a span of multi-track video recording tape as it is transported at high speed, said apparatus comprising:
   a curved support surface;
   a means for centering the recording tape and substantially sealing the airflow about the lateral edges of said recording tape as it is transported over said support surface comprising a pair of beveled flanges spaced apart at their base a distance less than the minimum width of said recording tape and located on opposite sides of the path to be followed by said tape over said support surface between the tangent points where said tape enters and exits from the guide in close proximity to said support surface; and
   first means located substantially at the tangent points where said tape enters and exits from said guide for providing air under pressure, and second means located in the portion of said support surface intermediate said first means for providing supplemental air support, to said tape whereby an air film of substantially constant pressure may be generated along the air chamber formed by said tape, support surface, beveled flanges and tangent points to support said tape;
   the geometry of said beveled flanges and the tape parameters being so correlated that said pressurized air film will operate in conjunction with said air chamber to maintain said tape in an equidistant relationship from said beveled flanges.

2. The apparatus of claim 1 wherein said second means includes a channel in said support surface extending essentially from one to the other of said first means, for facilitating the distribution of air.

3. The apparatus of claim 2 wherein said channel substantially extends across the entire width of said support surface.

4. The apparatus of claim 1 wherein said first means, which are located at the tape entry and departure tangent points comprise the sole means for providing air under pressure to support said tape.

5. The apparatus of claim 1 wherein said air providing means is an air jet.

6. The apparatus of claim 1 further comprising a compressed air supply connected to said first means whereby as said recording tape travels over said support surface said film of pressurized air will lift said tape off said support surface to a point where its width substantially equals the horizontal distance between said pair of beveled flanges, thereby maintaining said tape in a centered relationship with respect to the centerline of said support surface and urging said tape away from frictional contact with said support surface, beveled flanges and tangent points.

7. A method of supporting and guiding a span of multi-track video recording tape in a self-centering relation to the center line of a curved support surface having a pair of beveled flanges formed along its longitudinal sides which are spaced apart at their base a distance less than the minimum width of the recording tape and having a pair of tangent points where said tape enters and exits from the guide in close proximity to said support surface, said method comprising:

transporting the recording tape along the support surface at high speed;

tensioning the recording tape so as to maintain it in close proximity to said support surface; and providing air under pressure substantially at the tangent points where said tape enters and exits from said support surface generating an air film of substantially constant pressure along the air chamber formed by said tape, support surface, beveled flanges and tangent points sufficient to lift said tape off said support surface to a point where its width substantially equals the horizontal distance between said beveled flanges, maintaining said tape in a centered relationship with respect to the centerline of said support surface, urging said tape away from frictional contact with said support surface, beveled flanges and tangent points, and maintaining said tape in an equidistant relationship from said beveled flanges.

* * * * *